Patented Sept. 9, 1952

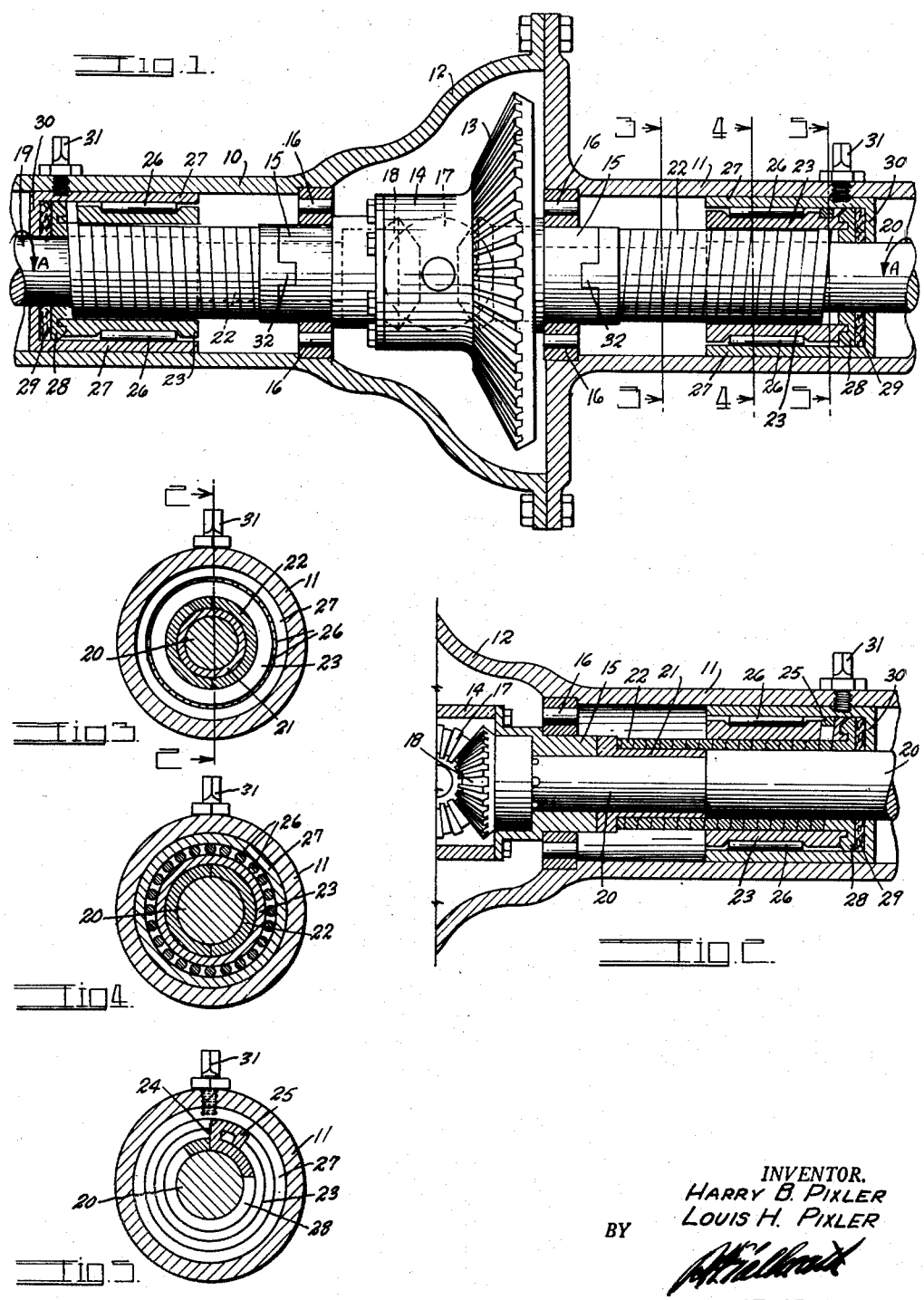

2,609,709

UNITED STATES PATENT OFFICE 2,609,709

DIFFERENTIAL GEAR CONTROL DEVICE

Louis H. Pixler, Englewood, and Harry B. Pixler, Denver, Colo.

Application June 2, 1950, Serial No. 165,702

5 Claims. (Cl. 74—711)

This invention relates to an improvement in automotive differential gearing. Automotive differential gearing is designed to allow one rear wheel to travel at a different rate of speed than the other rear wheel when the vehicle is traveling in an arc. This, of course, is a necessary function. However, the conventional differential gears allow one wheel to spin in mud, snow, or other slippery traction without imparting any driving torque to the remaining wheel. This makes it exceedingly difficult to extricate the vehicle from mud holes and the like, and also causes slippage or an uneven traction on slippery roads, thus creating side skidding and making it difficult to control the vehicle.

The principal object of this invention is to provide a device which may be applied to the conventional automotive differential gearing which will act to prevent either wheel from suddenly rotating faster than the other wheel under poor traction conditions.

Another object of the invention is to provide means which will accomplish the above without interfering with the normal turning differential action and without interfering with the reverse movement of the vehicle.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a longitudinal section through a conventional automotive vehicle differential looking rearwardly, illustrating a side view of the axle mechanism with the invention in place thereon;

Fig. 2 is a similar section of one half of Fig. 1, taken on the line 2—2, Fig. 3, with the axle mechanism shown in section; and Figs. 3, 4, and 5 are cross-sections taken on the lines 3—3, 4—4, and 5—5, respectively, Fig. 1.

In the drawing the right-hand portion of a rear axle housing is indicated at 10, and the left-hand portion thereof is indicated at 11. The two portions are joined at a differential housing 12. The differential housing 12 contains the usual bevel gear 13 mounted on and arranged to rotate a differential gear case 14. The gear case 14 is supported at its sides on hubs 15 rotating in suitable anti-friction bearings 16 in the axle housings 10 and 11. The gear case 14 supports the usual planet gears, indicated at 17, about axle drive gears 18 into which the extremities of two rear axles 19 and 20 are splined.

As thus far described, the mechanism is conventional in most automotive vehicles. The invention is applied by reducing the diameter of the inner extremities of the axles 19 and 20 and rotatably fitting a spring sleeve 21 over the inner extremity of each. The spring sleeves bring the diameters of the reduced portions of the axles to the same diameter as the adjacent axle surfaces. The spring sleeves 21 are secured to the hubs 15 in any desired manner. As illustrated, they are provided with tenons 32 which enter receiving notches formed in the hubs 15.

A flat bar or wire of resilient metal, preferably spring steel, is helically and tightly coiled about each collar 21 to form what might be termed cylindrical helical springs 22. The springs at the two sides of the differential gears are wound in opposite directions, as shown in Fig. 1. The springs 22 extend along the large diameter portions of the axles 19 and 20 for a distance substantially equal to the length of the collars 21. The portions of the springs 22 about the enlarged portions of the axles are surrounded by control sleeves 23. The outer extremities of the bars or wires forming the springs 22 are passed through openings 24 in the sleeves 23 and are turned back upon themselves, as shown in Fig. 5, to form locking hooks 25 which lock the outer extremities of the springs 22 to the sleeves 23.

The sleeves 23 are rotatably supported in roller bearings 26 by means of which they are mounted in outer bearing cups 27. The outer extremities of the sleeves 23 bear against retaining rings 28 which in turn bear against friction washers 29 riding against closed outer ends 30 in the cups 27.

The turns of the springs 22 are normally slightly separated. When installed, however, the cups 27 are forced toward the gear hubs 15 sufficiently to bring the turns of the spring substantially together, and the cups 27 are locked in this compressing position by means of set screws 31 threaded through the rear axle housings 10 and 11 so that the springs act to resiliently hold the rings 28 and the cup ends 30 in frictional engagement.

Let us assume that the vehicle is being driven straight forward. The two axles 19 and 20 are rotating forwardly, as shown by the arrow "A" in Fig. 1. The bevel gear 13, the gear case 14, the hubs 15, the springs 22, and the sleeves 23 are all rotating at the same speed as the axles 19 and 20. Now let us assume that the left wheel reaches slippery traction which allows the left axle 19, in Fig. 1, to suddenly rotate faster than the right axle 20 due to the fact that the planet gears will travel about the axis of the right drive gear 18 as is usual with differential transmissions. This will cause the gear case 14 and its hubs 15 to rotate forwardly faster than the axle 20 is rotating forwardly. The result is to cause the inner extremity of the right spring 22 to be rotated forwardly faster than the outer extremity thereof, since the outer extremity is retarded by the friction of the rollers 26 and the friction between the members 28, 29, and 30. This places a winding torque on the right spring 22, causing it to tightly wind about and grip the axle 20 and the left collar 21. This tends to cause the gear case to rotate in unison with the right drive gear so as to prevent relative rotation between the planet gears and the drive gears, thereby exerting a braking action on the spinning axle 19.

Should the axle 20 reach insecure traction and start to spin, the reverse of the above will take place and the opposite spring 22 will grip the opposite axle 19 to lock the gear case 14 to the latter. The gripping action of the springs is instantly released as soon as the planet case and axle resume the same speed due to the natural resiliency of the springs, which will return them to their normal non-gripping diameter.

Slow relative changes between the speeds of the axles and the speeds of the gear casing are compensated by relative movement between the control sleeve 23 and the bearing cup 27 so that the springs are not wound and contracted. Reverse rotation of the axles simply tends to unwind or diametrically expand the springs so that there is no clutching action in reverse.

It is well known that when a helical spring of the type employed in this invention is wound to decrease its diameter, there is a natural tendency for the turns of the spring to crowd together so as to shorten the over-all length of the spring coil. This natural phenomenon causes the springs 22 to shorten when they approach the axle-gripping position, so that the spring pressure on the friction washer 29 is released in proportion to the gripping action.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. In an automotive differential gear of the type having a planet gear case joining two axles, means for preventing either axle from suddenly rotating faster than the other, comprising: a collar secured to and extending outwardly from each side of said case about one of said axles, said axle having a reduced diameter portion which is rotatable in said collar, the portion of said axle adjacent said collar being of uniform external diameter therewith; and a helical spring wrapped about said collar and about the adjacent axle so that when said collar tends to rotate forwardly faster than said axle, said spring will wind so as to contract about both the collar and the axle so as to tend to lock the same together.

2. In an automotive differential gear of the type having a planet gear case joining two axles, means for preventing either axle from suddenly rotating faster than the other, comprising: a helical spring secured to each side of said gear case, each spring extending outwardly about one of said axles, said springs being wound so that they will be contracted about their respective axles whenever the speed of the gear case exceeds the speed of that axle; a sleeve surrounding and secured to the outer extremity of each spring; a bearing cup surrounding and providing a bearing to allow rotation of said sleeve in said cup; and means for preventing rotation of said cup.

3. In an automotive differential gear of the type having a planet gear case joining two axles, means for preventing either axle from suddenly rotating faster than the other, comprising: a helical spring secured to each side of said gear case, each spring extending outwardly from said gear case about one of said axles, said springs being wound so that they will be contracted about their respective axles whenever the speed of the gear case exceeds the speed of that axle; a sleeve surrounding and secured to the outer extremity of each spring; a bearing cup surrounding and providing a bearing to allow rotation of said sleeve in said cup; means for preventing rotation of said cup; and friction-creating means between said sleeve and said cup resisting relative rotation between said sleeve and said cup.

4. In an automotive differential gear of the type having a planet gear case joining two axles, means for preventing either axle from suddenly rotating faster than the other, comprising: a helical spring secured to each side of said gear case, each spring extending outwardly from said gear case about one of said axles, said springs being wound so that they will be contracted about their respective axles whenever the speed of the gear case exceds the speed of that axle; a sleeve surrounding and secured to the outer extremity of each spring; a bearing cup surrounding and providing a bearing to allow rotation of said sleeve in said cup; means for preventing rotation of said cup; and friction-creating means between the extremity of said sleeve and said cup resisting relative rotation between said sleeve and said cup when said spring is expanded, said friction-creating means being arranged to move longitudinally with said spring so that the friction will be released when said spring is contracted.

5. In an automotive differential gear of the type having a planet gear case joining two axles, means for preventing either axle from suddenly rotating faster than the other, comprising: a collar secured to and extending outwardly from each side of said case about one of said axles, said axle having a reduced diameter portion which is rotatable in said collar, the portion of said axle adjacent said collar being of uniform external diameter therewith; a helical spring wrapped about said collar and about the adjacent axle so that when said collar tends to rotate forwardly faster than said axle, said spring will wind so as to contract about both the collar and the axle so as to tend to lock the same together; a sleeve surrounding and secured to the outer extremity of each spring; a bearing cup surrounding and providing a bearing for said collar; means for preventing rotation of said cup; and friction-creating means between the extremity of said sleeve and said cup to resist rotation of said sleeve when said spring is expanded, said friction-creating means being arranged to move longitudinally with said spring so that the friction will be released when said spring is contracted.

LOUIS H. PIXLER.
HARRY B. PIXLER.

REFERENCES CITED

The following references are of record in the file of this patent:

UNITED STATES PATENTS

| Number | Name | Date |
|---|---|---|
| 1,057,466 | Taylor | Apr. 1, 1913 |
| 1,285,017 | Brush | Nov. 19, 1918 |
| 1,750,981 | Wildhaber | Mar. 18, 1930 |
| 1,979,414 | Smith | Nov. 6, 1934 |
| 2,410,921 | Avila | Nov. 12, 1946 |
| 2,431,272 | Mynssen | Nov. 18, 1947 |